Nov. 21, 1944.      R. SHIPMAN      2,363,444
MILLING MACHINE TOOL AND METHOD
Filed June 7, 1941      3 Sheets-Sheet 2
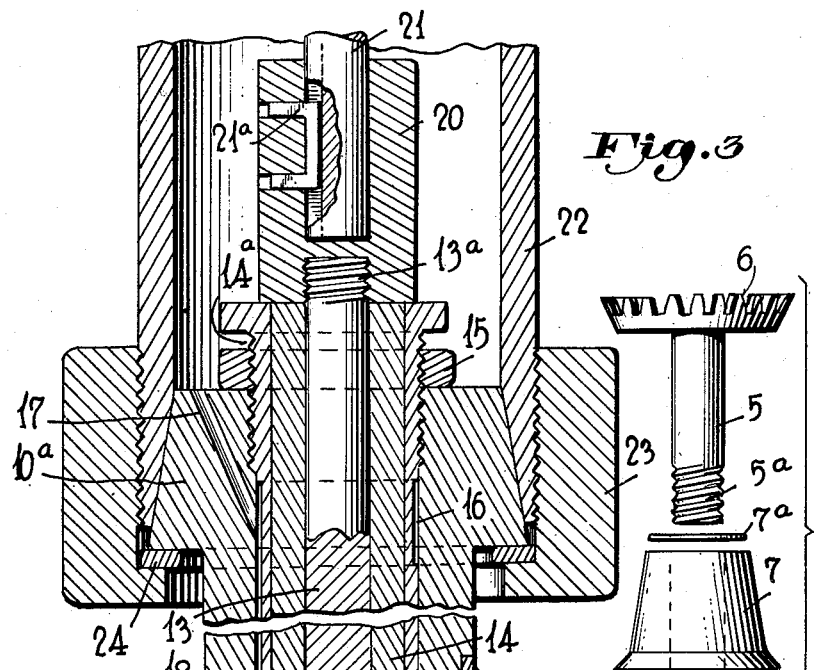
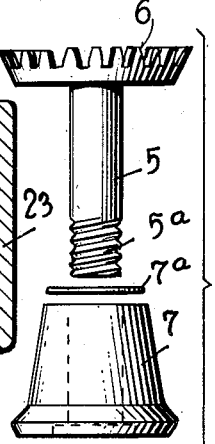
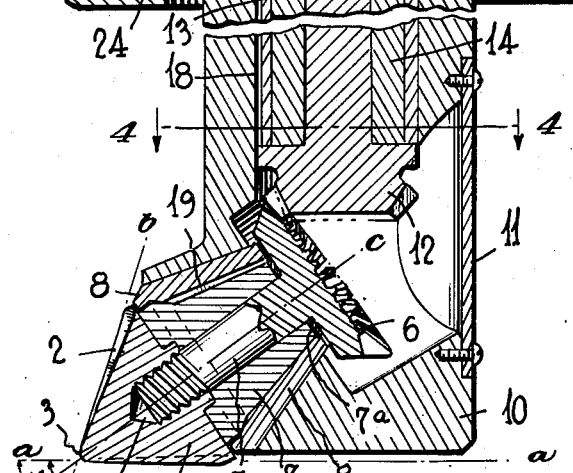
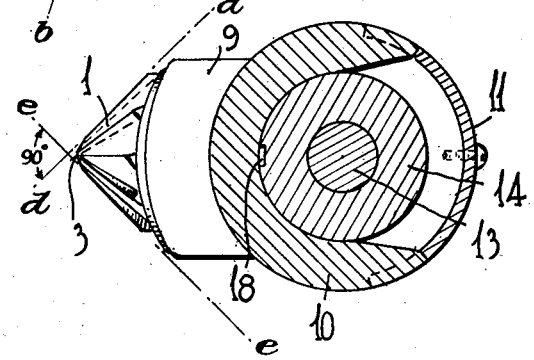

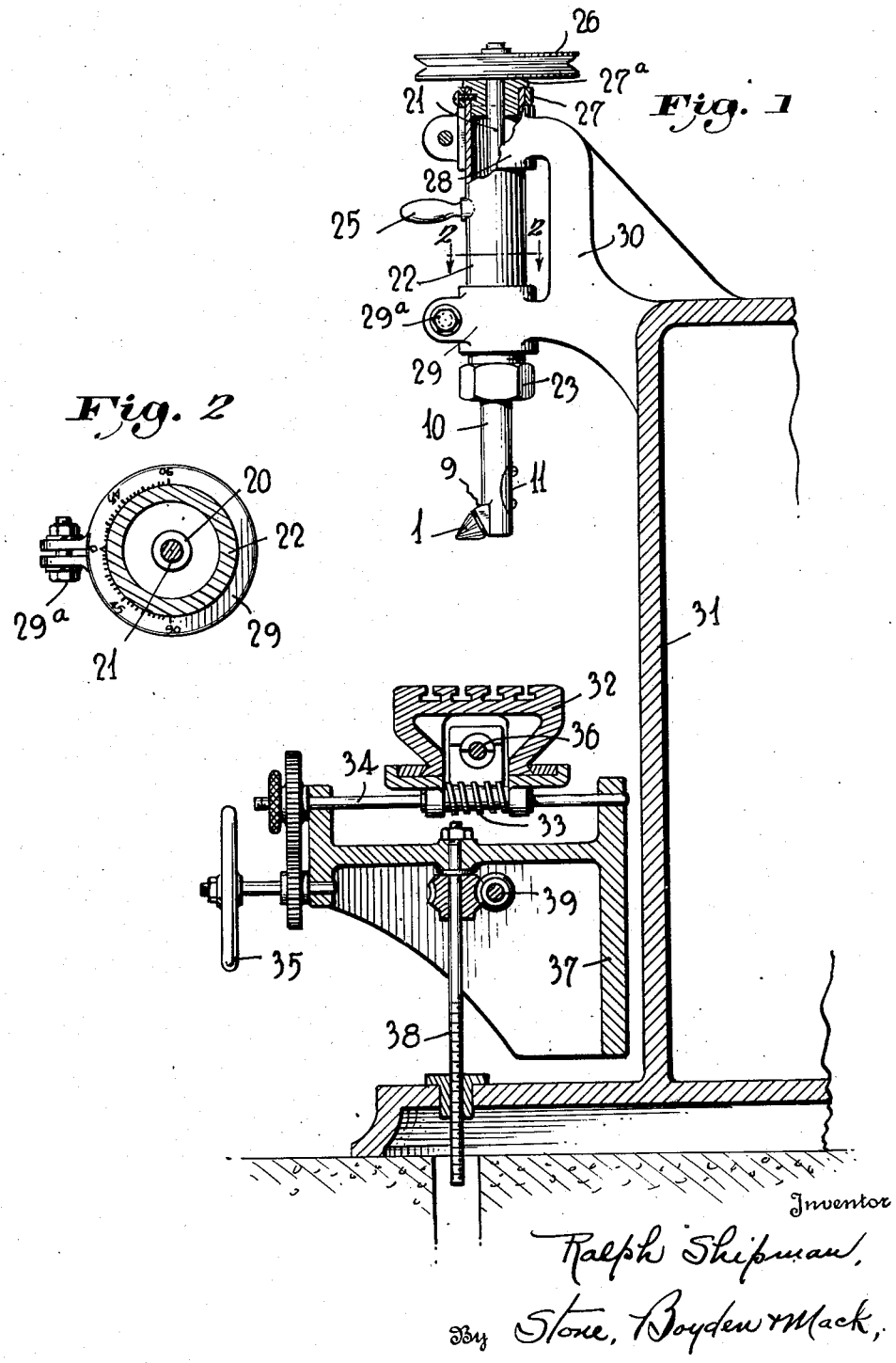

Nov. 21, 1944.    R. SHIPMAN    2,363,444
MILLING MACHINE TOOL AND METHOD
Filed June 7, 1941    3 Sheets-Sheet 3
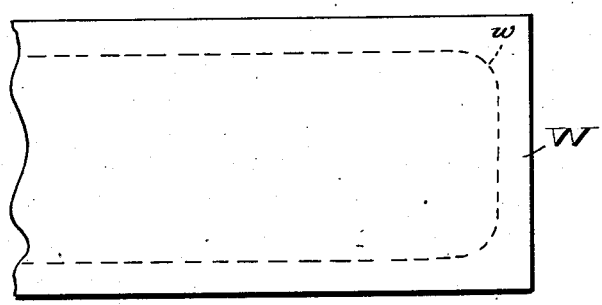
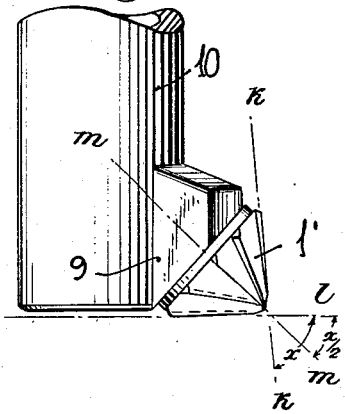
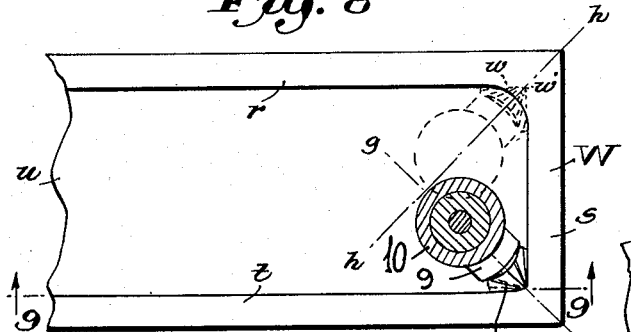
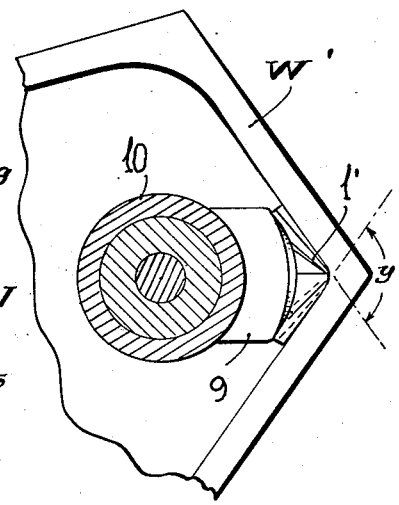
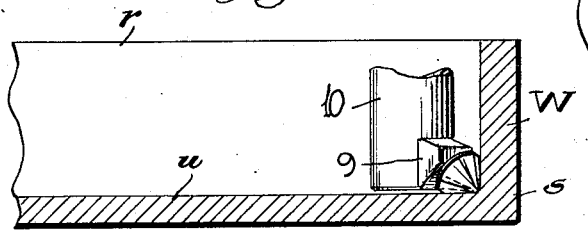
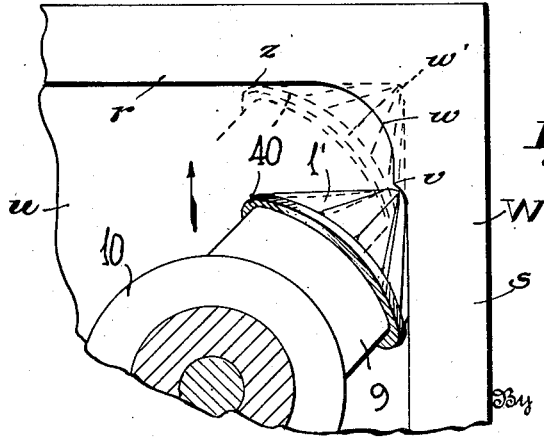
Inventor
Ralph Shipman,
By Stone, Boyden & Mack,
Attorneys Patented Nov. 21, 1944

2,363,444

UNITED STATES PATENT OFFICE 2,363,444

MILLING MACHINE TOOL AND METHOD

Ralph Shipman, Sunbury, Pa.; Raldo E. Shipman and I. Kenneth Shipman, executors of said Ralph Shipman, deceased, assignors, by mesne assignments, to themselves, as joint tenants Application June 7, 1941, Serial No. 397,108

12 Claims. (Cl. 90—17)

This invention relates to means for and a method of milling out the interior of hollow pieces, more particularly pieces which, when finished, comprise three angularly disposed walls meeting at a common point.

So far as I am aware, there is no tool known at present by which such a piece can be formed, in which the walls are connected by means of a relatively small fillet.

Let it be assumed, for example, that it is desired to mill out the interior of a rectangular block, the finished article to have a bottom, two side walls, and an end wall, and the side and end walls being connected with each other and with the bottom by relatively small fillets. Let it be further assumed, for example, that the block is, say, two inches high, and that it is desired to form fillets having a radius of, say, one-tenth of an inch. With the ordinary forms of milling cutters known at present, it is, of course, possible to mill out the interior of such a block, but it is not possible, by means of any tool of which I am aware, to form corner fillets having so small a radius. This, for the reason that any ordinary milling cutter employed must, of necessity, be much larger than one-fifth of an inch in diameter, in order to have the necessary rigidity and strength. In practice, it is probably not practicable to use for such work a cutter smaller than five-eighths or three-fourths of an inch in diameter. This, of course, would leave a fillet of relatively large radius between walls.

The primary object of the present invention is to devise a means and method by which the interior of such a block may be milled out in such manner as to leave between the meeting walls a relatively small fillet, such, for example, as one-tenth of an inch radius.

To this end, I propose to use a milling tool of conical form, and to mount such milling tool or cutter for rotation upon an axis disposed at an acute angle to one of the walls, such as the bottom, of the piece to be cut. I also propose to make the cone of such an angle that, when projected onto the plane of the above mentioned wall or bottom of the piece, the cutting surfaces of the cone will be parallel to all three of the walls to be cut, when the axis of the cutter lies in a plane bisecting the angle between the other two walls. In this way, the apex of the conical tool cuts out the material so as to form a fillet of any desired small radius.

A further object of the invention is to devise an improved construction of cutter and means for mounting the same, so that the cutter will be sufficiently rigid to withstand the strain to which it is subjected, and also so that it will be in close contact with relatively large masses of metal which will serve to carry off the heat.

A still further object is to provide a conical cutter having a gauge or stop disk associated therewith and adapted to engage a wall being cut so as to limit the extent to which cutting takes place.

With the above and other objects in view, and to improve generally upon the details of such apparatus, my invention consists in the construction, combination and arrangement of parts hereinafter described and claimed, and illustrated in the accompanying drawings forming part of this specification, and in which:

Fig. 1 is a side elevation of a portion of a milling machine showing one method in which my improved cutter may be mounted in relation thereto, parts being shown in section;

Fig. 2 is a horizontal section on an enlarged scale on the line 2—2 of Fig. 1, looking in the direction of the arrows;

Fig. 3 is a fragmentary vertical section on an enlarged scale through my improved tool or cutter, and the column on which it is mounted, parts being broken away;

Fig. 4 is a horizontal section substantially on the line 4—4 of Fig. 3, looking in the direction of the arrows;

Fig. 5 is a side elevation of my improved cutter assembly unit, the parts being shown as separated;

Fig. 6 is a central sectional view through a conical cutter similar to that shown in Fig. 3, but illustrating my improved gauge disk associated therewith;

Fig. 7 is a plan view of a piece to be cut, the same being in the form of a rectangular block;

Fig. 8 is a similar view showing the manner in which my improved tool operates on such a block in order to produce at the corners between the walls a fillet of small radius;

Fig. 9 is a vertical section substantially on the line 9—9 of Fig. 8, looking in the direction of the arrows;

Fig. 10 is a fragmentary plan view similar to Fig. 8, but on an enlarged scale, and showing the modified form of cutter illustrated in Fig. 6; and Figs. 11 and 12 are a side elevation and sectional plan view respectively showing how my improved tool may be adapted for cutting out corners of a piece in which the walls are disposed at an angle greater than 90° to each other.

Referring to the drawings in detail, and more particularly first to Figs. 3, 4 and 5, I employ a cutter 1 of conical form as shown, having flutes or cutting edges 2 extending along the surface thereof. While, for simplicity, these flutes or cutting edges are shown in the drawings as being straight and extending parallel with the elements of the conical surfaces, they may, if desired, be of helical form. In either case, the apex 3 of the cone is preferably of slightly rounded form, as shown, in order to cut the desired fillet.

The conical cutter 1 is provided with an axially threaded socket 4 into which screws the threaded end of a stub shaft 5, having at its other end, and preferably formed integral therewith, a bevel gear 6. Interposed between the cutter 1 and the gear 6, and surrounding said shaft 5 is a bushing 7, preferably made of hard steel, and of slightly tapering form, as shown, with its smaller end adjacent the gear. A washer 7a is preferably inserted between the small end of the tapered bushing and the gear, as illustrated.

For the sake of clearness, the above described parts have been illustrated in Fig. 5 in their separated condition. These parts are, however, adapted to be assembled into a unit by screwing the threaded end 5a of the shaft 5 tightly into the threaded socket 4 in the cutter, and when so assembled, these parts form an absolutely rigid unit, rotatable as a whole.

The bushing 7 is journalled in a bearing 8 of suitable soft metal mounted in a boss 9 projecting at an angle from the end of a hollow arm or column 10, and provided at its opposite side with an opening, closed by a removable cover 11, through which opening the gear 6 may be inserted. The conical cutter 1 is disposed beyond the end of the boss 9, so that its apex is located at a substantial distance laterally from the axis of said column.

This gear 6 is arranged to mesh with another bevel gear 12 carried at the end of a shaft 13 extending axially of the arm or column 10, and journalled in a bearing bushing 14. The upper end of this bushing is threaded as indicated at 14a and is surrounded by a lock nut 15, which bears upon the upper end of the arm 10. By adjusting the position of this nut, the extent of meshing between the gears 6 and 12 may be regulated as desired.

The upper end of the arm 10 is preferably enlarged or thickened as shown at 10a and is provided with an oil passage 17, which extends inwardly toward the bushing 14. This bushing is provided with an annular recess 16 adjacent the inner end of the passage 17, and from this recess extends a longitudinally disposed groove or duct 18, which carries the oil down to the gears and to the bearing 8. This bearing is preferably provided on its inner surface with one or more longitudinally extending grooves or ducts 19 to distribute the oil therealong. Sufficient oil is preferably used so that it collects in the interior of the arm 10 adjacent the gear 6 and forms a pool in which this gear rests.

By virtue of the construction described, it will be seen that the conical cutter 1 is in close contact and rigidly united with the relatively large bushing 7, surrounded by the bearing 8 and arm 10, and the close proximity of this large mass of metal to the cutter serves to carry off the heat therefrom and to maintain the cutter relatively cool. Any wear of the bushing 7, or its bearing, may be taken up or compensated for by substituting a thinner washer 7a, as required, so that the gear and cutter may be more closely drawn together.

The upper end of the shaft 13 is threaded, as shown at 13a, and engages a threaded socket in a coupling member 20. Also, inserted into this coupling member from the opposite end is a driving shaft 21 splined to the coupling by means of a key 21a.

The upper enlarged end 10a of the arm 10 is preferably tapered as shown and fits within the end of a sleeve 22. This sleeve is clamped to the head 10a of the arm 10 by means of a flanged nut 23, threaded on the sleeve, and bearing against the lower edge of the head. A washer 24 is preferably provided between the head and the flange of the nut, this washer having an opening smaller than the opening in the nut. This arrangement is for the purpose of facilitating assembly of the parts and to permit the nut to slip over the lower end of the arm adjacent the cutter 24.

Referring now to Fig. 1, I have illustrated conventionally one method in which my improved cutter may be mounted. The sleeve 22, constituting the upper part of the tool column, is held in a pair of spaced split clamps 28 and 29, carried by a bracket 30, secured to a suitable frame 31. The drive shaft 21, which extends up through the sleeve 22, has a belt pulley 26 secured to the upper end thereof, by means of which it may be driven. A collar 27 is preferably secured to the upper end of the sleeve in such manner as to rest upon the upper surface of the clamp 28 and thus support the sleeve when the clamping bolts are loosened, and a bearing 27a, through which the shaft 21 passes, is preferably fitted into the upper end of the sleeve.

As hereinafter more fully explained, it is desirable, in using my improved tool, to be able to swing the cutter from side to side about the axis of the arm 10. To this end, the entire column is capable of angular adjustment about its axis by means of a removable handle 25. When the clamping bolts, such as 29a, are loosened, the sleeve 22 may be rotated about its axis and set to any desired angular position. For convenience, the upper surface of the clamp 29 may have a scale thereon, as shown in Fig. 2, so that the operator may select the proper desired angle.

Referring again to Fig. 1, I have illustrated conventionally the usual work holder 32 to which the work may be clamped. This work holder is, as is customary, mounted for universal movement. That is to say, it may be moved toward and from the frame 31, by means of a worm 33 carried by a shaft 34 and operated by a hand wheel 35, and it may be moved in a direction perpendicular to the plane of the paper by means of a screw 36, also manually operated in any suitable manner. Furthermore, the entire frame 37 carrying the work holder may be raised and lowered as by means of a screw 38 operated by worm gearing through a shaft 39.

While, therefore, it is obvious that either the work or the tool may be moved during the cutting operation, it will be understood from the above description that in the embodiment shown, the tool column remains stationary while the work, carried by the holder or table 32, is moved as desired. Therefore, in the description and claims, where reference, for convenience, is made to movement or travel of the tool, it will be understood that relative movement between the work and tool is what is intended, and that it is immaterial whether the tool or the work actually moves.

Also, while, for simplicity, I refer to the tool supporting column as being vertical, and discuss the relation of the tool to a horizontal plane, it will, of course, be understood that these terms are only relative and that the horizontal plane is intended to mean a plane which is at right angles to the axis of the tool column.

Particular attention is now called again to Figs. 3 and 4. From an inspection of these two figures, it is obvious that the actual angle of the cone, as shown by the lines $a$, $b$ in Fig. 3, is less than the angle formed by the sides of the cone when projected onto a horizontal plane, as shown by the lines $d$, $e$ in Fig. 4.

If it is desired to have the projection of the cone on a horizontal plane such that the lines $d$ and $e$ intersect at a right angle, or ninety degrees, as shown in Fig. 4, I have found that, as can be mathematically demonstrated, the actual angle of the cone, as seen in Fig. 3, should be approximately seventy and one-half degrees, if, as shown, its lower side lies substantially in a horizontal plane $a$—$a$. In this case, of course, the shaft 5, constituting the axis $c$—$c$ of rotation of the cone, would be set at an angle to the horizontal equal to one-half that of the cone, namely, approximately thirty-five and one-quarter degrees.

I have found that this particular geometrical relation can be used very effectively in the milling out of a space bounded by three angularly disposed walls meeting at a common point or corner, especially where two of the walls are disposed at right angles to the third wall or bottom of the piece.

In Fig. 7, W indicates a piece of work in the form of a rectangular block of material which it is desired to hollow out so as to form an interior space open at the top and at one end, but bounded by three walls and a bottom, all disposed at right angles to each other, and connected by fillets of relatively small radius.

While it would be entirely possible to remove all of the material from the interior of this block by milling it out with my improved cutter, it would, in most cases, be more advantageous to first remove the bulk of the material by means of an ordinary milling cutter of conventional cylindrical form, with its axis perpendicular to the bottom of the piece. In Fig. 7, I have shown in dotted lines the appearance of the walls after the material in the center of the block has been thus removed by a conventional milling operation. It will be observed that the fillets, such as $w$, connecting the walls at the corners, are of relatively large radius, since, as above explained, the diameter of the mill cannot be reduced below a certain minimum on account of the necessity for making it large enough to withstand the strain.

In Fig. 8, I have shown a plan view of the same block W, which has been milled out as described, and now has its hollow interior bounded by side walls $r$ and $t$ and an end wall $s$ and bottom $u$. Thus, at either end of the end wall $s$ adjacent the bottom, there are three interior surfaces, namely, those of the bottom $u$, end wall $s$, and one of the side walls $r$ or $t$, which meet in a common point or corner, and which it is desired to have connected by a smooth fillet of relatively small radius, such, for example, as one-tenth of an inch. I produce this result by means of my improved tool, as follows.

The work being clamped to the table 32 in any suitable manner, the tool column is rotated about its axis in such manner as to bring the inclined axis on which the conical cutter is mounted for rotation into a plane which bisects the angle between two of the walls, such as $s$ and $t$, as shown by the broken line $g$—$g$ in Fig. 8. If the angle of the conical cutter is approximately seventy and one-half degrees, set on an axis inclined to the horizontal at an angle of approximately thirty-five and one-quarter degrees, as shown in Fig. 3, the remarkable fact develops that, when this axis is brought into a median plane, as shown in Fig. 8, the cutting surfaces of the cone are parallel at the same time to all three walls of the work, namely, the bottom $u$ and the walls $s$ and $t$. In order to remove the large fillet $w$ from the corner between the walls $s$ and $t$ and convert it into a fillet $w'$ of the desired small radius, the work is shifted so as to bring the apex of the cone to a point immediately over the corner to be cut, and in such a position that the sides of the cutter are tangent to the planes of the inner surfaces of the walls $s$ and $t$, as indicated by the lines $d$ and $e$ in Fig. 4. When, therefore, the work is then fed in such a direction as to cause relative vertical movement between the work and tool, the conical cutter moves down the corner between the walls $s$ and $t$, thus completely cutting away the relatively large fillet $w$ simultaneously from both walls and leaving only the desired small fillet formed by the curved apex of the cone. The movement of the cutter is continued until its lower side reaches the bottom of the piece, and it will be observed that the lower side of the cutter is parallel with the plane of the bottom, as shown in Fig. 9, and hence will finish the bottom perfectly flat.

Similarly, if desired, the work may be so traversed that the cutter, with its side in contact with the bottom and one wall, as shown in Fig. 9, or with one wall alone, may be caused to travel along that wall in a direction parallel therewith, and may, if desired, be caused to make successive cuts at different levels.

In order to remove the fillet from the opposite corner, namely, that between the walls $r$ and $s$ in Fig. 8, the tool column is swung on its axis through ninety degrees, so as to bring the plane of the cutter axis into the position indicated by the line $h$—$h$ in Fig. 8, as shown in dotted lines, and then the work moved so as to cause the cutter to travel downwardly along this corner.

It will thus be seen that by properly manipulating the tool and moving the work relative thereto, it is possible to use my improved conical cutter to mill out interior corners between meeting walls in any desired direction either horizontally or vertically, while at the same time the adjacent surfaces of these walls, being parallel with the cutting surfaces of the cone, are maintained absolutely true and flat. Thus my improved tool is capable of performing operations hitherto impossible with any known type of milling cutter.

While, with the construction so far described, my improved cutter will cut when travelling in any direction either forwardly or backwardly, with respect to the work, it is sometimes advantageous to employ a cutter which will cut only when moving forwardly and the sides of which will ride over a flat surface to which it is tangent without further cutting the same. To this end, I have devised the arrangement shown in Fig. 6, in which the conical cutter 1 is illustrated as provided at its large end with a neck 1ª on which is freely journalled a gauge or stop disk 40. The edges of this disk project out to a line forming a continuation of the conical surface, as indicated at f—f in Fig. 6. A conical cutter of this type is illustrated in use in Fig. 10. The cutter is shown as positioned against one wall s and as moving relative to the work in the direction indicated by the arrow. At v is shown inwardly projecting material which is to be removed from the wall s. Owing to the presence of the gauge disk 40, the cutter may be swung into engagement with the inner surface of the wall s, at some point to the rear of the position shown in Fig. 10, and, when progressed in the direction of the arrow, will slide along such wall without cutting, until the apex encounters the obstruction v. From this point onward, the cutter will remove the material, including that of the fillet w, and when it reaches the finished corner, will come to rest against the wall r because of the fact that the gauge disk 40 engages this wall at the point z thereof, and acts as a stop to prevent further movement. It will be understood that in the preceding discussion, the relative movement of the tool and work is intended to be effected manually, as indicated in Fig. 1, and the use of this gauge disk enables the operator to manipulate and control the tool by touch, rather than by sight. A power feed may, however, in some cases, be advantageously employed.

While, in the foregoing description, it has been assumed that all of the walls to be cut are at right angles to each other, so that a cone of seventy and one-half degrees set at an angle of thirty-five and one-quarter degrees to one wall, will simultaneously engage all three walls, my new method is by no means limited to pieces of rectangular configuration, but the same principle may be employed in milling out interior corners, the walls of which make any desired angle with each other.

I have illustrated this by way of example in Fig. 12, where W' represents a work piece, the side walls of which are disposed at an angle to each other considerably greater than ninety degrees, and the bottom may be at ninety degrees or some other angle to the walls.

In Fig. 11, I have shown a conical cutter 1', adapted to cut a corner such as shown in Fig. 12, and it will be seen that the actual angle of the cone k, l is considerably larger than seventy degrees and that it is set on an axis of rotation m—m which is inclined to the horizontal considerably more than thirty-five degrees.

So the broad principle applies, that a conical cutter having an angle x, and set on an axis of rotation disposed at an angle of x/2 to the horizontal, will cut out a corner between a bottom wall and vertical side walls disposed at any desired angle y to each other. The exact relation between the angle x of the cone and the angle y of the corner to be cut can be mathematically determined.

If the bottom wall is not at right angles to the side walls, the angle of the axis of rotation to the horizontal may be different from x/2.

What I claim is:

1. A milling machine comprising a conical cutter, a shaft on which said cutter is rigidly secured, a column in which said shaft is journaled to rotate, the axis of said shaft being disposed at an angle to a plane perpendicular to said column equal to one-half the angle of the cone, and means for rotating said shaft and cutter, said means comprising a second shaft enclosed within said column and parallel with the axis thereof.

2. A milling machine comprising a vertical column, a conical cutter mounted at the lower end of said column, a shaft on which said cutter is rigidly secured, said shaft being journaled in said column with its axis disposed at an angle to the horizontal equal to one-half the angle of the cone, and means for rotating said cutter comprising a vertical shaft within said column and geared to said first-mentioned shaft.

3. A milling machine comprising a stationary vertical column, a vertical drive shaft journaled therein, and a conical cutter driven by said shaft and rotatably mounted at the lower end of said column with its apex laterally offset from the axis of said column, the axis of rotation of said conical cutter being disposed at such an angle that the lower side of the cutter is substantially tangent to a horizontal plane, along a straight line, no portion of said shaft or column projecting below said plane.

4. A milling tool comprising a column, a conical cutter rotatably mounted at the end of said column with its apex offset laterally from the axis of said column, means for rotating said conical cutter, the axis of rotation thereof being disposed at an acute angle to the axis of said column such that the cutting surface of said conical cutter is tangent along a straight line to a plane at right angles to said column, no part of said column projecting beyond said plane, and means whereby said column may be angularly adjusted about its own axis so as to swing said cutter substantially in said plane into any desired position.

5. A milling tool comprising a cutter having an axial threaded socket, a column on which said cutter is supported to rotate about an axis disposed at an angle thereto, a shaft having at one end a threaded portion engaging said socket and having a gear rigidly secured to the other end, and a bearing in said column in which said shaft is supported, said column having a lateral opening at the side opposite said cutter through which opening said shaft and gear may be inserted and removed.

6. A milling tool comprising a cutter having an axial threaded socket, a column on which said cutter is supported to rotate about an axis disposed at an angle thereto, a shaft having at one end a threaded portion engaging said socket and having a gear rigidly secured to the other end, a separable tapered bushing clamped axially between said cutter and gear and constituting therewith a rigid unit, a bearing in said column in which said bushing is journalled, and means for taking up wear comprising interchangeable washers of different thicknesses surrounding said shaft and interposed between the small end of said bushing and the adjacent surface.

7. A milling tool for removing material from the interior of a piece to form a space bounded by three walls meeting at a common point, said tool comprising a conical cutter, a shaft on the end of which said cutter is rigidly secured, a support in which said shaft is journaled to rotate, and means for driving said shaft, the axis of said shaft being disposed at one half the angle of the cone with respect to one of said walls, whereby said conical cutter is tangent to a plane parallel with said wall, the angle of the cone of said cutter being such that, when its axis bisects the angle between the other two of said walls, its cutting surface is also simultaneously tangent to planes parallel with both said last mentioned walls.

8. In the production of a piece having an interior space bounded by three angularly disposed walls meeting at a point and having a relatively small fillet between them, the method which comprises first milling out the space in a known manner so as to form walls with a relatively large curved fillet between them, and then removing the material of such large fillet to form the small fillet by means of a conical milling cutter mounted on an axis disposed at one-half the angle of the cone with respect to one wall, the angle of the cone being so chosen that, when mounted on such axis disposed in a plane bisecting the angle between the other two walls and with its apex toward the meeting point, its sides lie respectively parallel with said other two walls.

9. In the machining of a piece having an interior space bounded by three angularly disposed walls with relatively large fillets between them, the method of replacing such large fillets with relatively small fillets which comprises employing a conical milling cutter, mounting such cutter for rotation on an axis disposed at one-half the angle of the cone with respect to one wall, choosing the angle of the cone so that, when mounted on such axis disposed in a plane bisecting the angle between the other two walls, its sides lie respectively parallel with said other two walls, bringing said cutter over the fillet to be removed, with the apex of the cutter in line with the small fillet to be formed, and with the sides of the cutter lying substantially in the planes of the surfaces of the said other two walls, and then feeding the cutter relatively longitudinally of the fillet in a direction toward the first mentioned wall.

10. A milling tool comprising a conical cutter, a shaft on which said cutter is rigidly secured, a column in the extreme end of which said shaft is rotatably mounted, the axis of rotation of said shaft being disposed at an acute angle to the axis of said column such that the cutting surface of the cutter is tangent along a straight line to a plane extending perpendicular to the axis of said column, and a second shaft for driving said first mentioned shaft, no part of said second shaft intersecting said tangent plane.

11. A milling tool comprising a conical cutter, a shaft on which said cutter is rigidly secured, a vertical column in the extreme lower end of which said shaft is rotatably mounted, the axis of rotation of said shaft being disposed at such an angle to the axis of said column that the cutting surface of the cutter is tangent along a straight line to a horizontal plane, and a vertical driving shaft within said column mechanically connected with said first mentioned shaft and terminating substantially above said plane.

12. A milling tool comprising a column, a laterally extending shaft journaled in the extreme end of said column, a conical cutter rigidly secured to one end of said shaft with its apex disposed radially outward from the axis of said column, the other end of said shaft terminating within said column, the axis of rotation of said shaft lying at such an angle to the axis of said column that the cutting surface of said conical cutter is tangent along a straight line to a plane perpendicular to said column, and means for driving said shaft, said means comprising a second shaft within said column extending parallel with the axis thereof but terminating short of the end of said column.

RALPH SHIPMAN.